United States Patent [19]

Solomon et al.

[11] Patent Number: 5,472,622
[45] Date of Patent: Dec. 5, 1995

[54] SALT BASKET FOR CRYSTALLIZER AND METHOD OF USE IN ZERO LIQUID DISCHARGE INDUSTRIAL FACILITIES

[75] Inventors: Robert L. Solomon, Seattle; Ferris C. Standiford, Bellevue; Joseph Bostjancic, Renton; Dan Peterson, Renton; George R. Jones, Renton, all of Wash.

[73] Assignee: Ionics, Incorporated, Watertown, Mass.

[21] Appl. No.: 51,035

[22] Filed: Apr. 20, 1993

[51] Int. Cl.$^6$ .................................................... C02F 1/04
[52] U.S. Cl. ...................... 210/767; 210/770; 210/771; 210/805; 210/472; 210/445; 210/482; 159/42; 159/45; 159/47.1; 203/DIG. 20; 422/245.1; 422/254
[58] Field of Search ......................... 159/42, 45, 47.1; 422/245.1, 254; 210/767, 768, 770, 772, 771, 805, 808, 472, 445, 446, 482; 203/DIG. 20

[56] References Cited

U.S. PATENT DOCUMENTS

| | | |
|---|---|---|
| 330,209 | 10/1885 | Colwell . |
| 375,946 | 1/1888 | Miller . |
| 428,469 | 5/1890 | Domeier et al. . |
| 464,389 | 12/1891 | Pick . |
| 697,366 | 4/1902 | Ribaud . |
| 775,577 | 11/1904 | Ordway . |
| 807,767 | 12/1905 | Ordway . |
| 905,568 | 12/1908 | Ordway . |
| 951,559 | 3/1910 | Duncan . |
| 1,230,162 | 6/1917 | Holsbawm . |
| 1,508,130 | 9/1924 | Sanger . |
| 1,831,121 | 11/1931 | Kermer . |
| 2,033,985 | 3/1936 | Haney . |
| 2,330,221 | 9/1943 | Kermer . |
| 2,350,934 | 6/1944 | Schutte . |
| 2,470,822 | 5/1949 | Johnson . |

(List continued on next page.)

OTHER PUBLICATIONS

Canadian Department of Mines publication No. 325 entitled "Report on the Salt Deposits of Canada and the Salt Industry", by L. H. Cole, issued in 1915. See pp. 117–129.

The Economics of Wastewater Recycling at a Los Angeles County Cogeneration Plant, by K. P. Hammer, P. C. Eglesten, Jr., and R. S. Ludlum, presented at Watertech 1992 in Houston, Tex., Nov. 1992.

Case Studies: Zero Liquid Discharge Systems at Three Gasfired Power Plants, by D. Rowlin and R. Ludlum, presented at the 1992 American Society of Mechanical Engineers Cogen Turbo Power Congress Meeting in Houston, Tex. in Sep., 1992.

Water Management for Reuse/Recycle, by S. D. Strauss, published in Power Magazine, May, 1991.

Evaporator and Spray Dryer Combination Eliminates Residual Wastewater Lagoons, by R. McIntosh and A. E. Hodel, published in Chemical Processing, in Feb., 1990.

Primary Examiner—Thomas M. Lithgow
Attorney, Agent, or Firm—R. Reams Goodloe, Jr.

[57] ABSTRACT

An improved salt basket for dewatering solids, particularly salts resulting from evaporation of industrial wastewaters. The salt basket system includes a pressurizable vessel having a screen floor situated above a bottom liquid collection head, an inlet for the brine/solids slurry from which solids are to be separated and dried, an inlet for air, an inlet for steam (the latter two inlets may be combined, where convenient), an inlet for solids free feed, and a drain outlet (these two may be combined where convenient into a combination feed/drain connection). Preferably, an automated system for introducing feed brine and for removing the solids product is provided. For safety, a pivotally attached lower door has a hydraulic failsafe closure mechanism and locking safety latches to prevent the door from inadvertently opening. The process control design minimizes exposure of the salt basket interior to supersaturated solutions with precipitating solids therein, thus reducing scaling of the salt basket, by introducing feed brine rather than magma (crystal/concentrated liquor slurry) to the salt basket between crystal harvest cycles.

23 Claims, 10 Drawing Sheets

U.S. PATENT DOCUMENTS

| | | |
|---|---|---|
| 2,479,001 | 8/1949 | Burke . |
| 2,602,023 | 7/1952 | Simms . |
| 2,606,820 | 8/1952 | Harms . |
| 3,248,181 | 4/1966 | Akimoto . |
| 3,515,199 | 6/1970 | Summers . |
| 3,599,701 | 8/1971 | Mellerstedt . |
| 4,299,786 | 11/1981 | Sanderson et al. . |
| 4,318,772 | 3/1982 | Kragh . |
| 4,458,889 | 7/1984 | McPherson . |

FIG. 6 OPERATING CYCLE

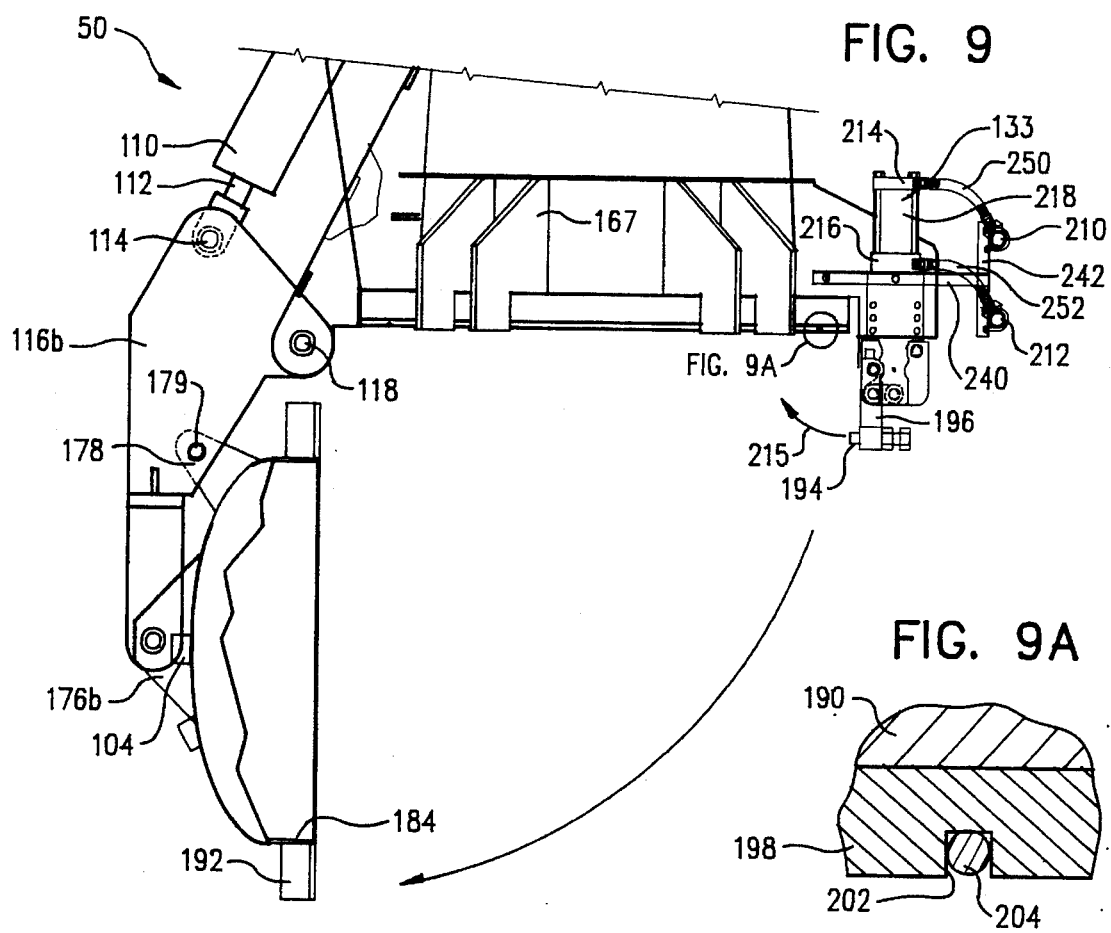
FIG. 9
FIG. 9A
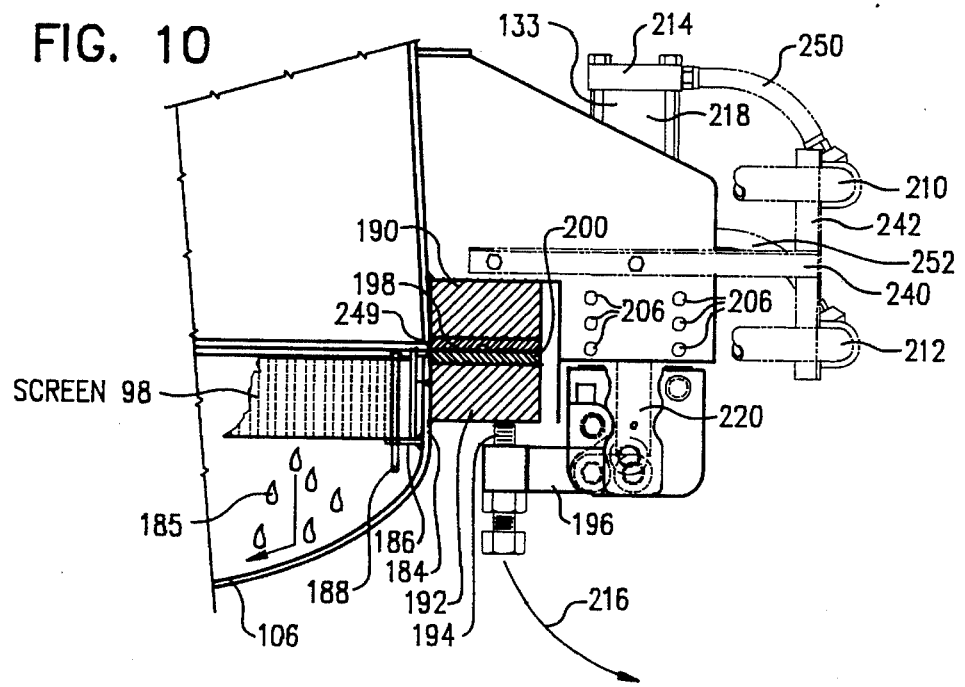
FIG. 10

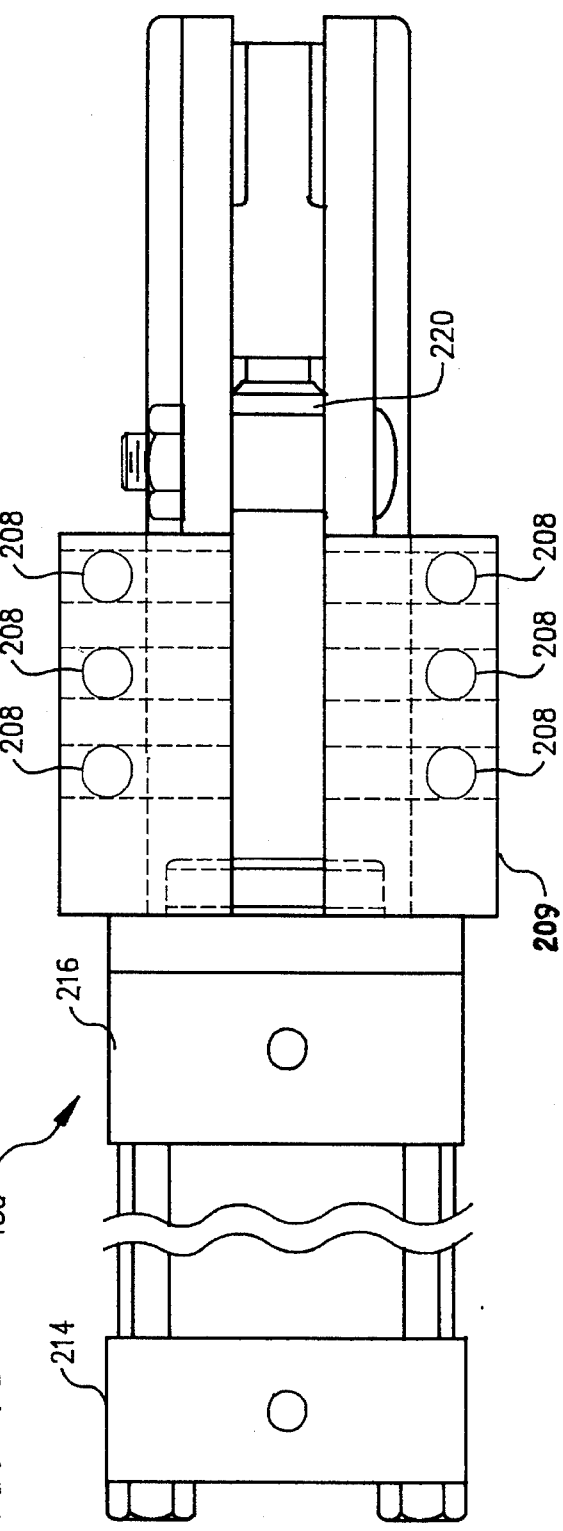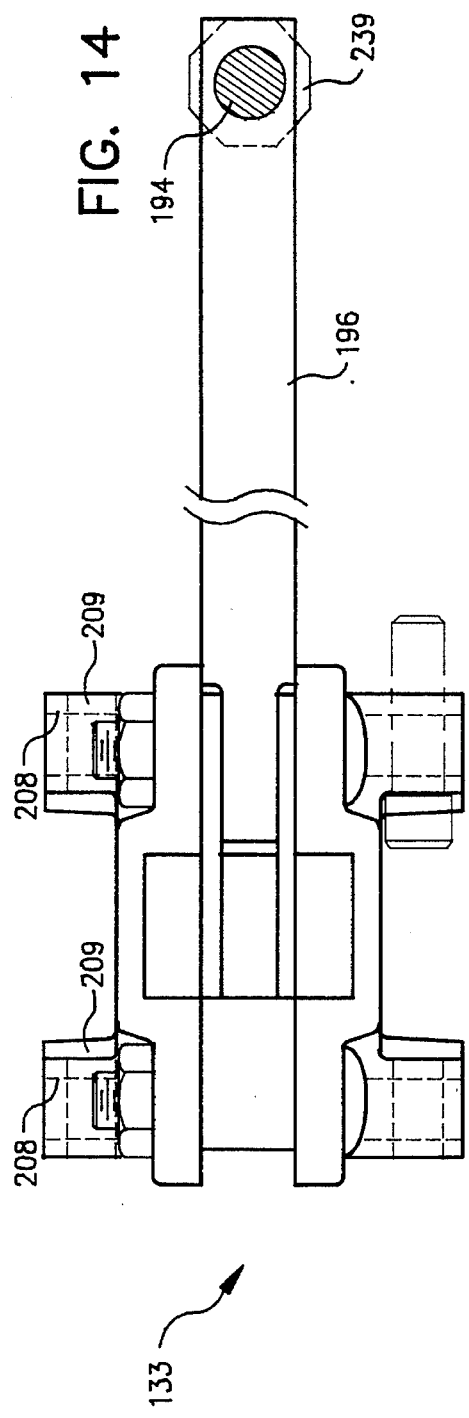

SALT BASKET FOR CRYSTALLIZER AND METHOD OF USE IN ZERO LIQUID DISCHARGE INDUSTRIAL FACILITIES

TECHNICAL FIELD OF THE INVENTION

The present invention relates to crystallization of salts from industrial wastewaters, and, more particularly, to novel, improved systems for removal of substantially dry salts from a crystallizer or crystallizing evaporator, and to the application of such systems to zero liquid discharge type industrial wastewater treatment plants.

BACKGROUND

A number of systems for collecting and removing salts from crystallizers have heretofore been proposed. One interesting summary of previously used systems is disclosed in Canadian Department of Mines publication No. 325 entitled "REPORT ON THE SALT DEPOSITS OF CANADA AND THE SALT INDUSTRY," by L. H. Cole, issued in 1915. Such systems primarily consisted of a calandria type crystallizer with a salt basket chamber attached therebelow. The the salt basket was generally mounted on the ground or at a working platform. Typically, those crystallizers and the attached salt baskets were used for recovering crystals of highly solubility salts (those which (a) form highly concentrated solutions with water and which (b) are increasingly soluble at increasing temperature). Typically, the the salt was shoveled out of the salt basket through manually opening side doors.

Systems of the type identified above have been in use for about one hundred (100) years, and have mainly been used in the recovery and refining of various commercially utilized salts. The most significant use of such salt baskets has been with the manufacture of sodium chloride (NaCl), or table salt. Such heretofore known systems have the decided disadvantage that they offered few automatic operational features. Also, the removal of salt typically required substantial manual labor.

In so far as we are aware, the above described previously known salt baskets have not been utilized in combination with modern evaporator or brine concentration systems which distill the wastewaters at many industrial plants such as coal fired steam-electric generating plants, co-generation electrical generating facilities, metals smelting and refining facilities, pulp mills, chemical plants, and the like. Indeed, when such modern wastewater treatment systems have been unable to utilize large solar ponds for the discharge to and drying of the of concentrated brines and precipitated salts, recovery of the precipitated salts for disposal has been accomplished by resorting to the use of relatively expensive and otherwise undesirable alternatives such as filter presses, centrifuges, or spray dryers. Descriptions of such systems are found in a variety of trade publications, including: THE ECONOMICS OF WASTEWATER RECYCLING AT A LOS ANGELES COUNTY COGENERATION PLANT, by K. P Hammer, P. C. Egleston, Jr., and R. S. Ludlum, presented at WATERTECH 1992 in Houston, Tex., November 1992; CASE STUDIES: ZERO LIQUID DISCHARGE SYSTEMS AT THREE GAS-FIRED POWER PLANTS, by D. Bowlin and R. Ludlum, presented at the 1992 American Society of Mechanical Engineers COGEN TURBO POWER CONGRESS Meeting in Houston, Tex. in September, 1992; WATER MANAGEMENT FOR REUSE/RECYCLE, by S. D. Strauss, published in POWER Magazine, May, 1991; and EVAPORATOR AND SPRAY DRYER COMBINATION ELIMINATES RESIDUAL WASTEWATER LAGOONS, by R. Mcintosh and A. E. Hodel, published in CHEMICAL PROCESSING, in February, 1990.

The use of spray dryers, centrifuges, or filter presses for water solids recovery at zero discharge type wastewater treatment plants are not without disadvantages. Spray dryers consume large amounts of energy to evaporate residual brine from the solids being dried. In addition, in many jurisdictions, an air emissions permit is required for the discharge of heated air (normally including direct combustion products) which is vented from the spray dryer. Filter presses often consume expensive chemical additives in an attempt to increase the dryness of the residual salt cake. Centrifuges are rather expensive and the high speed rotating parts not infrequently require costly repairs. For both filter presses and centrifuges, it often seems that an inordinate amount of, labor is expended to coax the systems through their required service, and unplanned additional maintenance requirements are a relatively common occurrence.

SUMMARY

We have now invented, and disclose herein, certain new and improved salt basket systems which are free of the disadvantages of, and otherwise superior to, the prior art solids handling systems for industrial wastewater plants of the character discussed above.

These novel, improved salt basket systems, generally speaking, include a pressurizable vessel having a screen floor situated above a bottom liquid collection head, an inlet for the brine/solids slurry from which the solids are to be separated and dried, an inlet for air, an inlet for steam (the latter two inlets may be combined, where convenient), a feed brine inlet and a drain outlet (these two may be combined where convenient into a combination feed/drain connection), an automated system for introducing feed brine, and an automated system for removing the solids product, the latter system including an automated door with a fail safe clamp system design. The vessel shape is preferably somewhat bell shaped, ideally having sidewalls of substantially circular cross section with downwardly and outwardly or somewhat conically shaped walls which are, to the extent practical, free from protuberances which would tend to prevent salt crystals from falling downwardly- The salt baskets components may be fabricated of high strength alloys suitable for highly corrosive environments. At the same time, the system components are simple and relatively inexpensive to manufacture, and the resulting systems are accordingly sufficiently inexpensive (particularly when compared to the previously available alternatives) to be employed in even very small zero discharge wastewater systems.

Perhaps most prominent among the novel features of the salt basket systems disclosed herein is the type of door employed, particularly the opening and closing system and the air actuated safety latching system. In contrast to previously known manually opening salt basket doors, the door of the present invention utilizes a remotely actuated arm. For convenience, we have chosen to utilize a hydraulic arm with locking fitting which is normally closed to maintain hydraulic pressure in the closure arm, so that the door is kept from shifting or opening, even in the event of a power failure or failure of the locking safety latches to prevent the door from opening.

Specialized, air actuated locking power clamps with high strength locking arms are utilized for door latches. The latches are biased toward the normally closed position. The latches require actuator pressurization to overcome the meta-stable latch bias mechanism, in order to release the latch toward the open position. This is quite important in the present application where the salt basket vessel may contain a hot, boiling liquid/solids slurry and/or pressurized steam.

An additional novel feature is the process control design which minimizes exposure of the salt basket interior to supersaturated solutions with precipitating solids therein, thus reducing scaling of the salt basket. More importantly, the entire solids handling process is essentially fully automatic, from introduction of a slurry containing solids into the unit through removal of the solids and preparing the system for another cycle of solids handling, thus reducing plant labor requirements.

OBJECTS, ADVANTAGES, AND NOVEL FEATURES

From the foregoing, it will be apparent to the reader that one important and primary object of the present invention resides in the provision of novel, improved systems for removal of precipitated solids from wastewater treatment plants.

Related and also important but more specific objects of the invention reside:

in the provision of a method to provide substantially dry salts without the need to employ an expensive drying apparatus such as a filter press, centrifuge, or spray dryer;

in the automation of a solids recovery and handling system to eliminate the need for manual labor to remove salts from a salt basket;

in the design of a fail safe closure and clamp system to prevent accidental opening of the salt basket vessel;

in the combination of an improved salt basket apparatus with conventional wastewater evaporation systems to reduce the overall life cycle costs (combined capital and operating costs) of such systems.

Other important objects, features, and advantages of the invention will be apparent to the reader from the appended claims and as the ensuing detailed description and discussion proceeds in conjunction with the accompanying drawing.

BRIEF DESCRIPTION OF THE DRAWING

In the drawing:

FIG. 9 is a fragmentary view of the bottom portion of the salt basket, showing the movement of the door upon opening.

FIG. 9A is an enlarged detail taken along the line 9A—9A of FIG. 9, showing details of the upper flange, clad flange construction with a receptacle groove and o-ring fitting therein.

FIG. 10 is a fragmentary view the bottom portion of the salt basket, showing the door details when in the closed position.

FIG. 13 is a back view of the locking power clamp.

FIG. 14 is a partial front view of the locking power clamp arm with adjustment means, shown in the open position.

DESCRIPTION

Although the improved salt basket and method of operation described herein may be adapted for use in many types of separation applications involving the removal of solid particles from liquids, it is particularly useful in processes employing crystallizers to produce salts by evaporating water from solutions. The most troublesome of such solutions are normally those containing both (1) the slightly soluble deposit forming solutes such as calcium sulfate, silica, calcium phosphates, calcium fluoride, or calcium carbonate, and (2) the highly soluble solutes such as sodium chloride, sodium sulfate, or the like. Such solute combinations are commonly encountered in the process of recovering distilled water from wastewaters at zero liquid discharge type industrial plants in a variety of locations.

Figure 1:
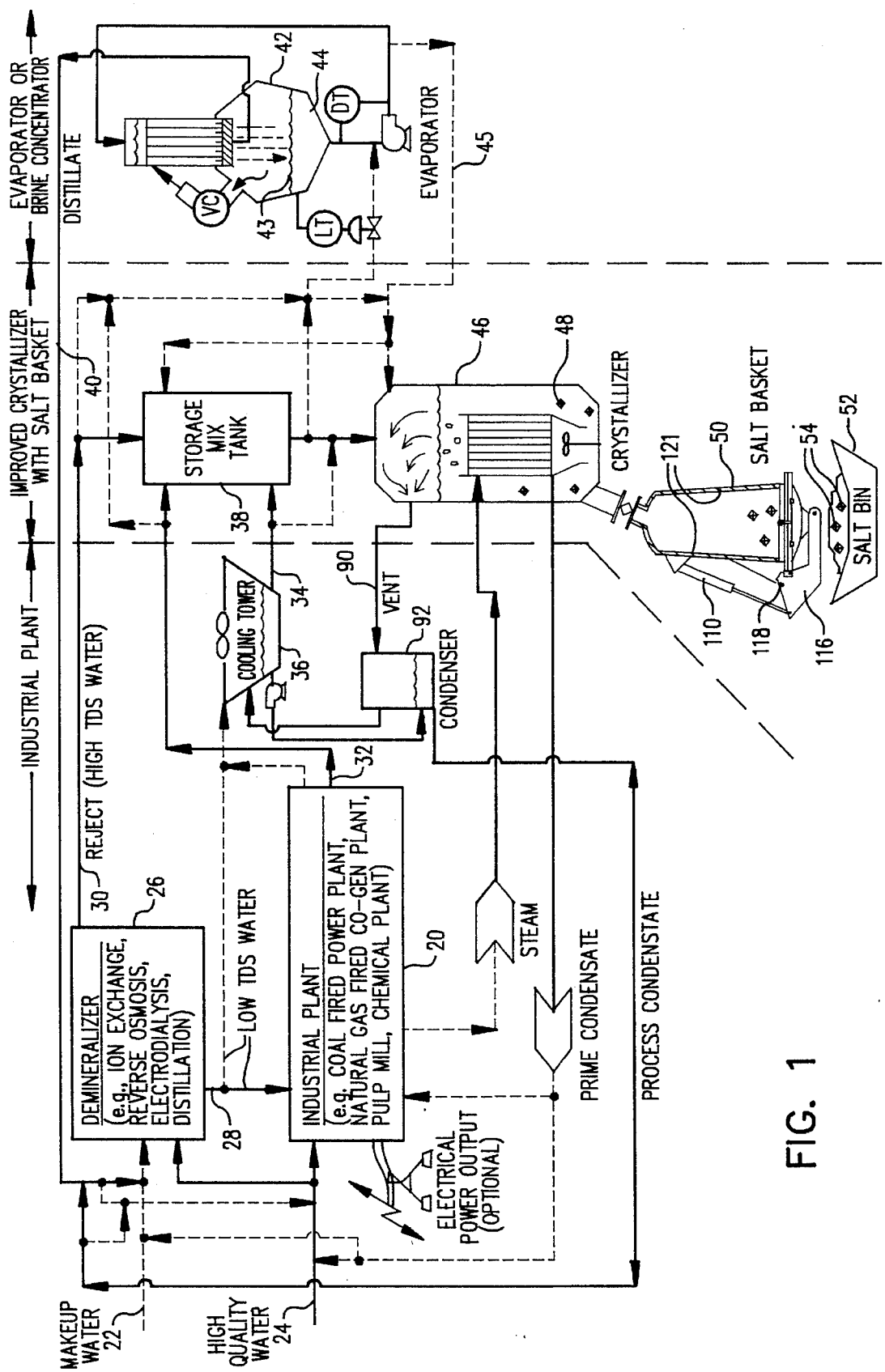
FIG. 1 is a generalized schematic of industrial wastewater treatment systems where the improved crystallizer and salt basket solids handling system of the present invention may be employed.

As can be appreciated by reference to FIG. 1, water removal from brines containing mixed solutes is suitable for practice at a wide variety of industrial plants 20. Such plants may be coal fired power plants, electrical co-generation plants, chemical plants, oil refineries, pulp mills, or the like. Such plants have numerous requirements for water. Water may be required for steam boilers, injection in gas turbines, cooling towers, scrubbers, flue gas desulphurization systems, and innumerable other uses. Typically, makeup water 22 to such plants contains some mineral content, and increasingly, the mineral content (amount of solute) is somewhat higher than desirable. When an insufficient quantity of high quality water 24 (low in mineral content) is available, some type of demineralization plant 26 is normally required at the industrial plant 20 to prepare makeup water 22 for the desired industrial uses, by removing a portion of the mineral content from the makeup water 22 and producing water product 28 with relatively low total dissolved solids (TDS) and a reject stream 30 that is relatively high in total dissolved solids. Various types of process are well known for removing mineral content from water, such as ion-exchange, reverse osmosis, softening, electodialysis, or distillation.

In zero liquid discharge type industrial facilities, once the reject stream 30 leaves the demineralizer 26, or discharge stream 32 leaves the plant 20, or cooling tower blowdown 34 leaves the cooling tower 36, the streams 30, 32, and 34 must be collected and neutralized, such as in storage/mix tank 38, and then further concentrated to reduce their volume by recovering relatively pure water therefrom. It is frequently desirable to concentrate the mineral content of these combined wastewater streams to substantially dry solids and thus in the process recover essentially all of the water from such waste streams. In one common practice, the water is recovered as distilled water 40 containing less than 10 parts per million of total dissolved solids, while the calcium sulfate and silica in the wastewater is preferentially precipitated in a brine concentrating evaporator 42 by use of calcium sulfate anhydrite nucleation crystals. That method is generally described in U.S. Pat. No. 4,618,429, entitled METHOD OF MAINTAINING ADEQUATE SEED CRYSTAL IN PREFERENCIAL PRECIPITATION SYSTEMS, issued Oct. 21, 1986 to H. R. Herrigel, the disclosure of which is incorporated herein by reference. Also, the evaporator 42 used in such systems to concentrate the inversely soluble salts are described in a report entitled SCALE FREE VAPOR COMPRESSION EVAPORATION, by the Office of Water Research and Technology, U.S. Department of the Interior, distributed by the Superintendent of Documents, U.S. Government Printing Office, Stock No. 024-000-00839-9, GPO 1977 0-247-979. This latter reference, although not essential for those trained in the art, will be of assistance to those learning the art and is hereby incorporated herein by reference. By use of such seeded slurry technique, precipitation of salts inversely soluble with temperature such as calcium sulfate, as well as other scale forming minerals such as silica, can be prevented from occurring on heat transfer tubes and other process equipment while the circulating brine is concentrated up to just below, or not appreciably above, the crystallization point of the more soluble salts, such as sodium chloride, sodium sulfate, glauber's salt, or the like. Feed to evaporator 42 is normally regulated by the level 43 of liquid in the sump 44 and the density of such liquid is measured to control the dissolved solids concentration. As will be appreciated by those trained in the art, the upper dissolved solids concentration limit setting, and the suspended solids concentration required, will vary widely depending upon the specific mixture of solutes in the water, but general guidelines may be determined from literature references describing the solubility of mixed salt solutions. Of course, wastewater can also be evaporated without resort to such seeded slurry technique, although alternate processes are generally more troublesome due to scaling tendencies experienced during concentration of the brine.

In any event, once the desired brine concentration is reached in evaporator 42, the concentrated circulating brine is discharged (line 45) from the evaporator 42 and introduced into a crystallizer 46. A variety of crystallizer designs are well known, but in general such devices are specially designed to provide adequate operational characteristics (time period between cleaning) when crystallizing the soluble salts. Various known types include forced circulation crystallizers, circulating magma crystallizers, and Oslo type crystallizers, and our improved salt basket and method may be adapted for use with any of the well known crystallizer types. We prefer the use of a propeller calandria type crystallizer, also sometimes known as a draft tube baffle type crystallizer.

Heretofore in wastewater treatment plant installations, in so far as we are aware, the salt 48 in crystallizer 46 upon discharge, if dewatered, has been typically dewatered in a filter press or centrifuge, or rarely, in a spray dryer. We have now discovered that an improved, automated salt basket 50 eliminates the labor and expense of handling the produced wet salt 48 in such relatively high maintenance equipment as the filter press or centrifuge, and dramatically reduces overall system life cycle costs. Further, by mounting the salt basket 50 above a receiver 52 (preferably a machine transportable waste container or dumpster bin is employed, although direct discharge to a pit structure may be used) a relatively dry salt crystals 54 may fall directly into receiver 52 by gravity. Receiver 52 may be easily removed, emptied, and/or replaced as necessary to accommodate the quantity of dry salt crystals 54 being produced.

Figure 2:
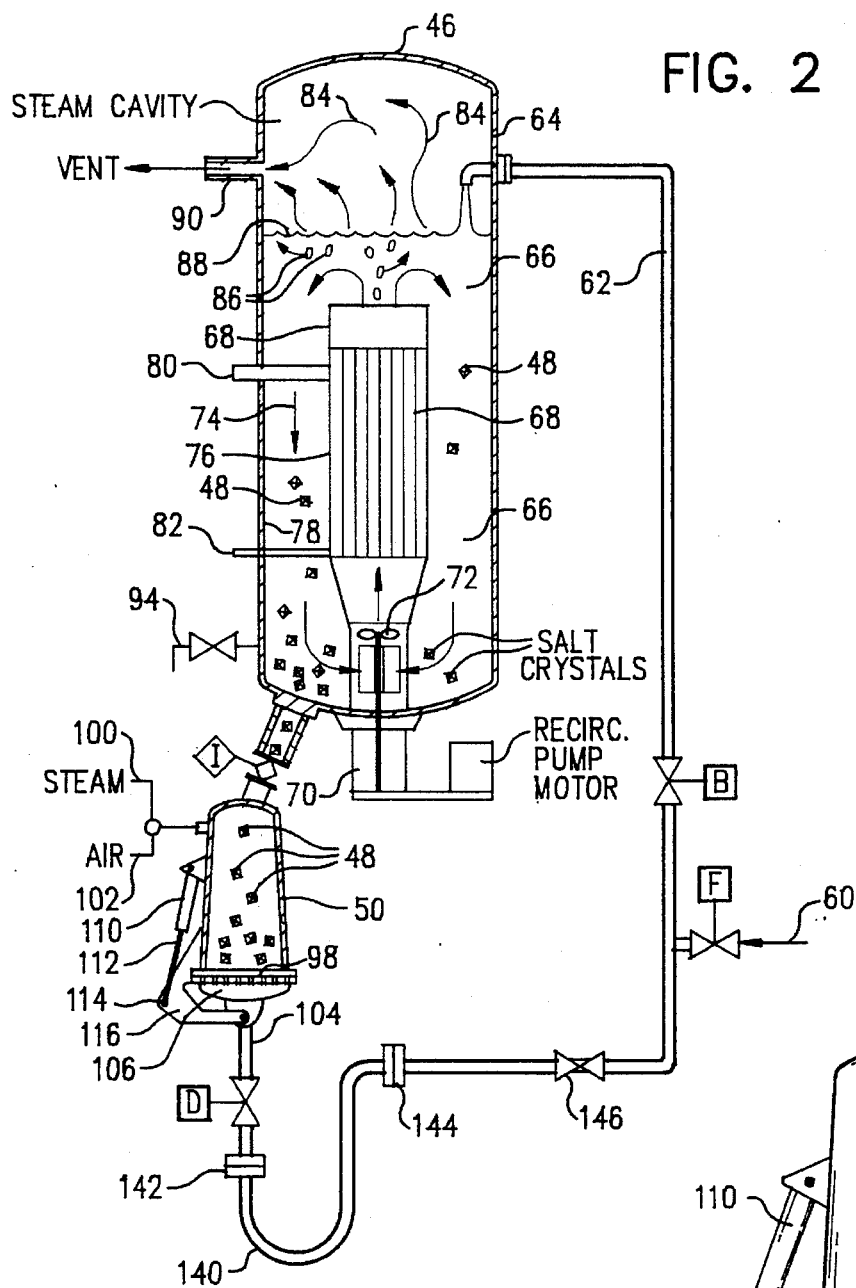
FIG. 2 is a simplified process flow diagram, illustrating the operation of a crystallizer and salt basket apparatus.

Attention is now directed to FIG. 2, where the basics of the operation of a crystallizer 46 and salt basket 50 are shown. Brine feed 60 is introduced into a feed line 62. Feed brine 60 may be a relatively solids free but high mineral content solution, or may be a highly concentrated solution having therein suspended solids of sparingly soluble salts such as calcium sulfate, in accord with nucleation technique mentioned above. Feed line 62 terminates in the upper reaches 64 of the crystallizer vessel 46. The feed 60 mixes with and becomes part of the circulating magma 66 (supersaturated solution) from which the wet salt crystals 48 grow. Normally, a submerged upflow heater 68 is provided with an axial type pump 70 with propeller 72 to force the magma 66 up through the heater 68, and the magma 66 with salt crystals 48 suspended therein gradually flows downward in the direction of reference arrows 74 between the outer portion 76 of the heater and the inner wall 78 of the crystallizer 46. Steam 80 is introduced into the heater 68 to heat the circulating magma 66, and resulting prime condensate 82 is captured and returned elsewhere for reuse. The vapors 84 generated by evaporation of water from the magma 66 bubble 86 upward to the liquid/vapor interface 88 and thence escape outward through a process vent 90 to a suitable condenser 92 (shown in FIG. 1). Generally, this type of crystallizer is often known in the trade as a propeller calandria.

For normal operation of our improved salt basket, we isolate the crystallizer 46 from the salt basket 50 via way of isolation valve I, until a sufficient quantity of crystals 48 are available in the circulation magma 66 for harvesting, as may be determined by draw-off of a sample through sample port 94. During this isolation and crystal forming period, the salt basket 50 is preferably full of feed brine 60 or another selected liquid or slurry stream; ideally the material placed in the salt basket 50 during this period will be of such composition that it will tend will not to scale the interior walls 96 of the salt basket 50. When it is time to harvest the crystals 48, isolation valve I is opened. Wet salt crystals 48 flow by gravity downward through isolation valve I and accumulate in the salt basket 50 above a bottom screen 98. After closing isolation valve I, supply of feed brine 60 is terminated by closing valve F, and the drain valve D in the salt basket 50 is opened. Steam 100 and/or air 102 is introduced into the salt basket to force the free liquids surrounding wet crystals 48 downward through the screen 98 and out through the drain/liquid return line 104 and drain valve D, and thence up the feed line 62 to return the same to the interior of the crystallizer vessel 46. After purging the free liquids from the interior of the salt basket 50, sufficient steam 100 and/or air 102 is introduced through the salt basket 50 to produce substantially dry salt 54, whereupon the supply of steam 100 and/or air 102 is halted. Then, the salt basket vessel 50 is vented in preparation of opening of the door 106. In many applications, salt 54 is sufficiently dry if it passes the so-called paint filter test utilized by the United States Environmental Protection Agency, and similar agencies of the various states; reference is made to the U.S. Code of Federal Regulations, 40 CFR Section 264,314, and EPA Publication SW-846, Method 9095.

Figure 3:
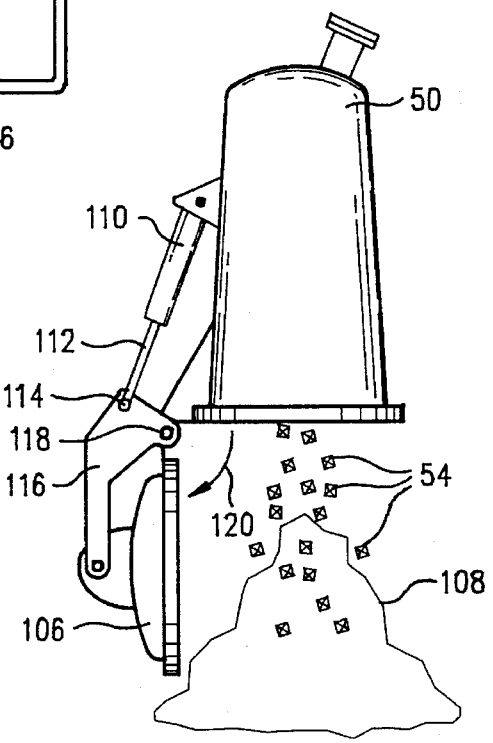
FIG. 3 is simplified side elevation view of the salt basket portion of the present invention, illustrating operation thereof.

Turning now to FIG. 3, it is clear that as door 106 is opened, dry salt crystals 54 are allowed to fall directly downward to form a solids pile 108. One convenient door 106 design utilizes a hydraulic actuator 110 to pull via shaft 112 on elbow pivot 114 of door crank 116, to pivot the door crank 116 and the door 106 affixed thereto about a main pivot pin 118 in the direction indicated by reference arrow 120, to open door 106. Since before opening of the door 106 the dried solids 54 are held above the screen 98, upon opening of door 106 such solids 54 slide off of the screen 98 and fall downward, as does the bulk load of solids 54 which, before opening, is held up inside the salt basket 50.

Figure 4:
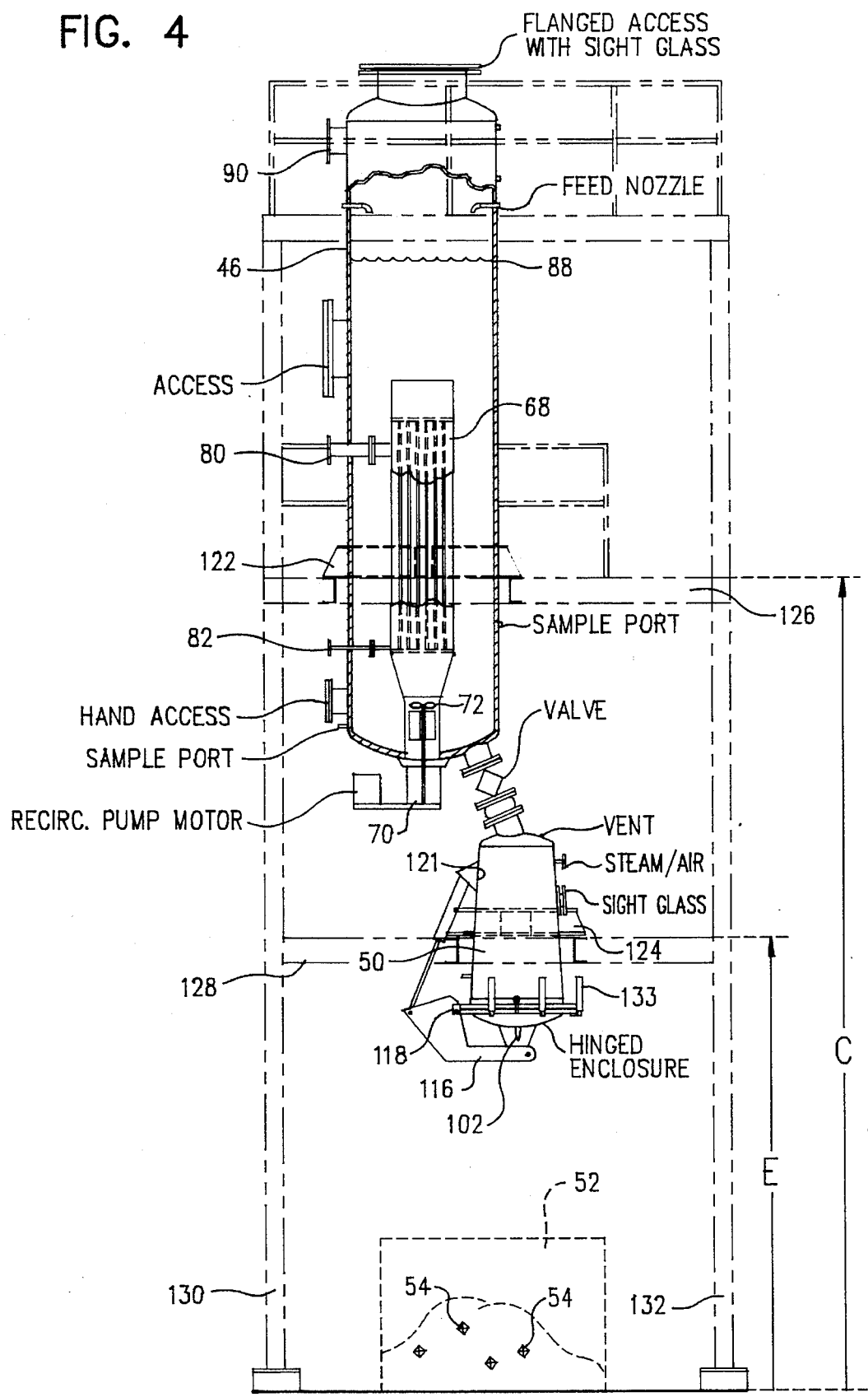
FIG. 4 is a side elevation view with partial cutaway of a crystallizer and salt basket showing key elements of construction.

To fully take advantage of the just described salt basket 50 construction and door 106 opening result, overall crystallizer/salt basket plant layout is important. One suitable configuration is illustrated in FIG. 4. The salt basket vessel 50 shape is preferably somewhat bell shaped, ideally having inner sidewalls 121 of substantially circular cross section which are downwardly and outwardly slanted, (or somewhat conically shaped or even outwardly flared walls) which are, to the extent practical, free from protuberances which would tend to prevent salt crystals from falling downwardly.

The crystallizer 46 and salt basket 50 are supported at sufficient elevation C and E respectively above a reference datum, preferably by support brackets 122 and 124 resting on structural members 126 and 128 respectively, so that (1) wet salt 48 may flow by gravity from the crystallizer 46 into the closed salt basket 50, and (2) the dried salt 54 may fall directly from the opened salt basket 50 into a receiver or salt bin 52 as described above, without the need for manual labor to handle the dried salt product 54. The necessary distance will vary depending upon the size of the various vessels, but may in particular the elevation E may be set to accommodate the receiver 52 and the clearance necessary for door 106 when in the downward or vertical position as illustrated in FIG. 3 above. Therefore, the height of supporting structure shown in FIG. 4, such as columns 130 and 132, may be set accordingly during the plant design stage.

Aside from the important configuration just described, also noted in this FIG. 4 at the bottom of salt basket 50 are the clamps 133 which secure door 106 from rotating about pivot pin 118; the design and operation of the clamps 133 and accompanying control system are more completely described herein below.

Figure 5:
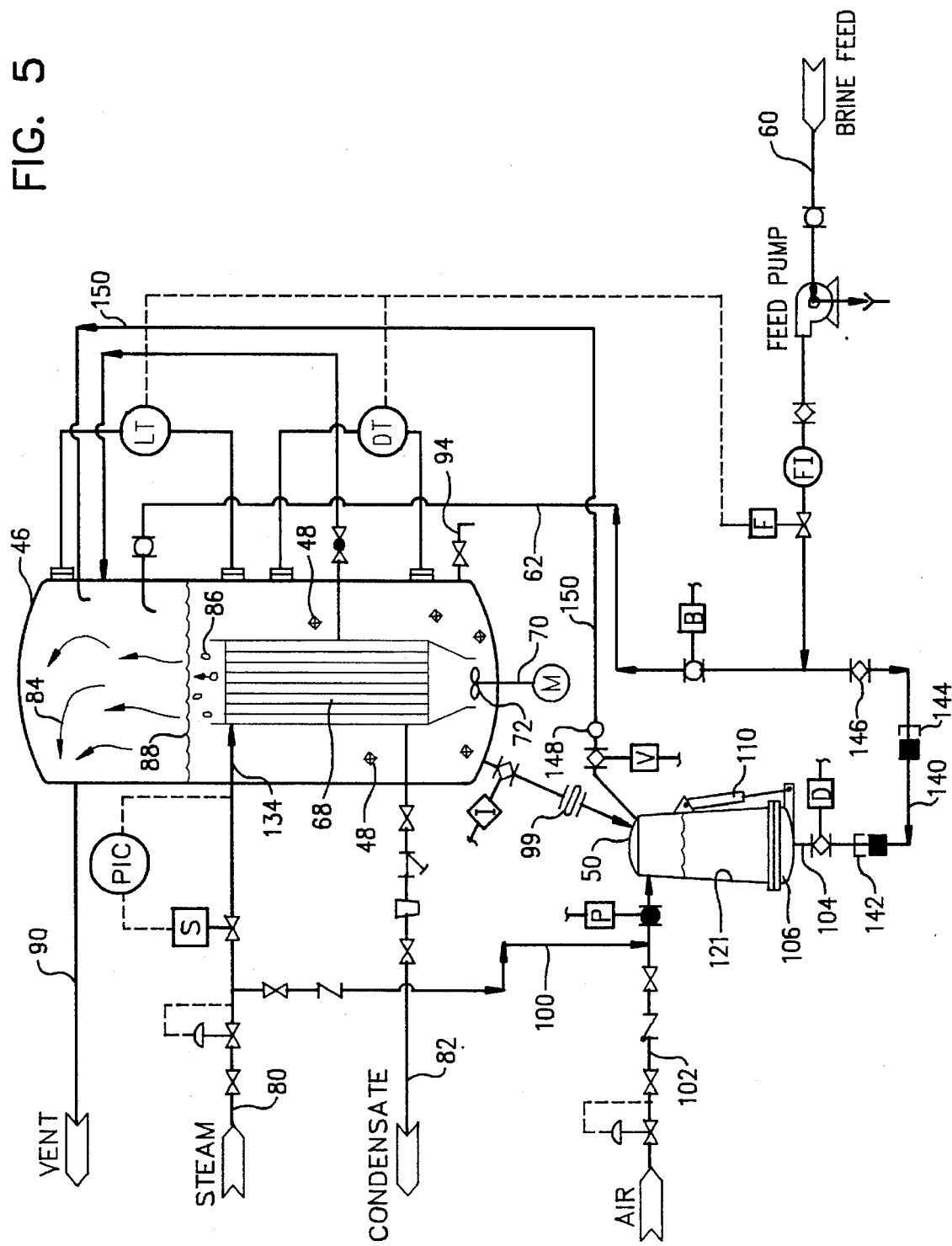
FIG. 5 is a process flow diagram, illustrating the key process control elements for automatic operation of the crystallizer and salt basket system.
Figure 6:
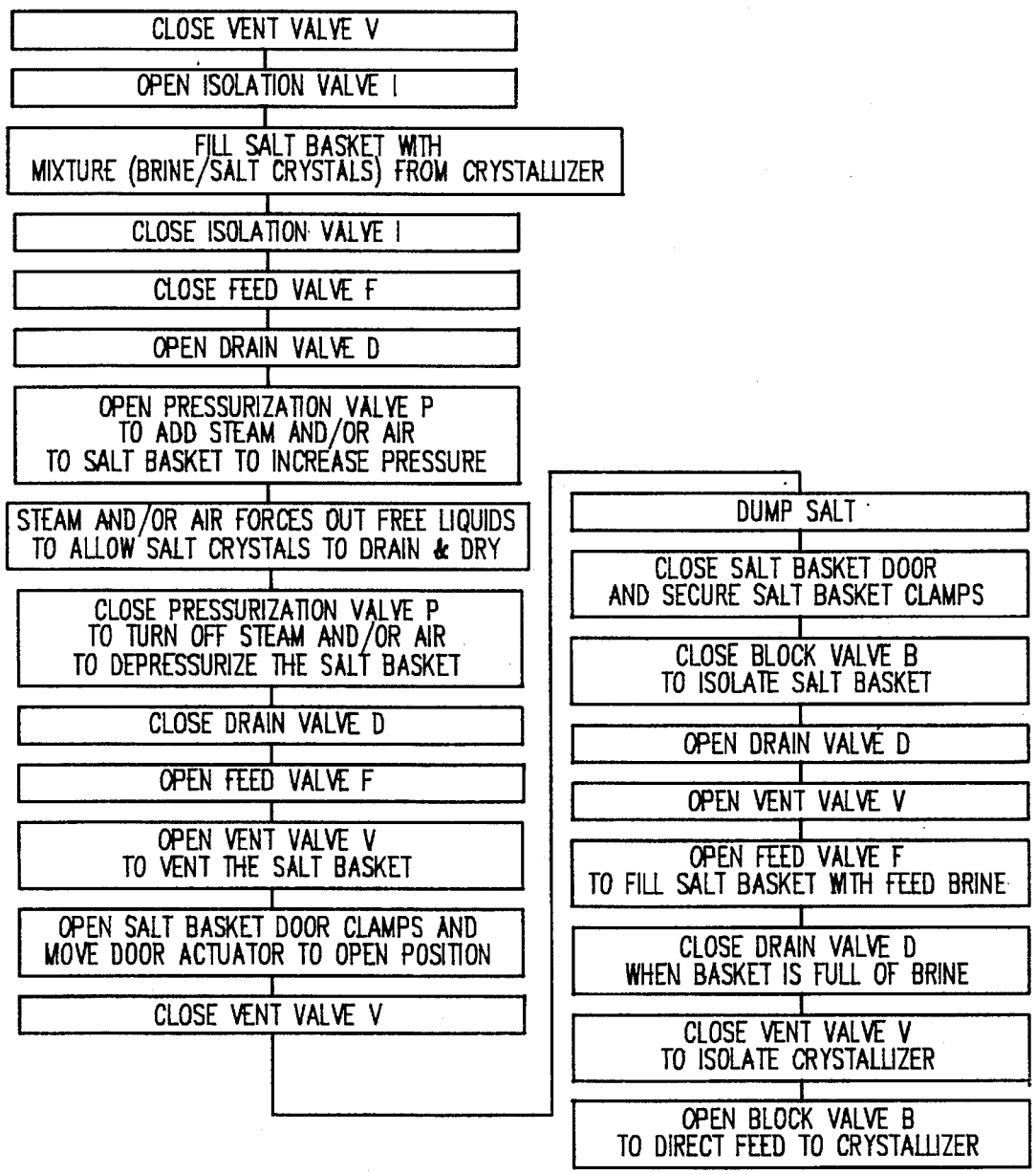
FIG. 6 is a process flow block diagram, illustrating an exemplary sequence of control for the automated operation of an improved crystallizer and salt basket for harvesting crystallized solids.

Attention is now directed to FIG. 5 a process flow diagram, and related FIG. 6 showing the control cycle for salt crystal harvest, which figures together are convenient to assist the reader in appreciating the unique automatic operational sequence of our crystallizer and salt basket combination. First, the crystallizer is controlled conventionally, with the major control loops providing for automatic control of (1) the liquid level 88 in the crystallizer 46 and (2) the steam pressure in the heater 68. With respect to liquid level 88, the level 88 is sensed by a level transmitter LT, with feedback to the feed valve F, which in turn admits additional feed brine 60 upon drop in liquid level 88, or reduces the flow of brine 60 upon rising liquid level 88. The liquid level 88 is maintained high enough to assure that the heater 68 will not become dry and thus exposed to fouling and scaling. The density transmitter (DT) signal automatically compensates the level transmitter signal for the changing density of the circulating magma 66 as it becomes concentrated.

With respect to the crystallizer steam control loop, plant steam 80 at any convenient pressure is controlled by steam valve S (with help from a conventional pressure reducing station, if necessary) to supply steam 134 pressure of nominally 10 psig (pounds per square inch) entering the steam side of heater 68. The steam supply 134 pressure is measured and controlled by a pressure indicator controller marked PIC in FIG. 5. As the crystallizer fouls or scales, the pressure of supply steam 134 is raised to compensate for the reduced differential temperature in the crystallizer, to maintain crystallization rate as necessary. Normally, the crystallizer is run without significantly varying the steam flow rate.

Crystal harvest is normally done batchwise, and crystals 48 are harvested upon completion of a crystal growth cycle. The density and TSS (total suspended solids) are monitored, and allowed to build up to a preselected level which may vary somewhat depending upon the salts being precipitated and the cycle times resulting in relation to plant staffing schedules. Generally, somewhere between 10% and 30% TSS is selected for the end of the crystallization operations and the beginning of a salt harvest cycle. We have found that starting the harvest when the suspended solids level is between 12 and 18% TSS is normally desirable. As a convenient final check, the operator may confirm the TSS by taking a sample through port 94 and visually observing the settling solids proportions and settling rate in a test cone or cylinder.

Once the decision has been made to harvest the salt, upon harvest cycle initiation, the salt basket harvest cycle is completed through the operation of a series of automatic valves by a computerized programmable logic system. While the specifics of any PLC (programmable logic control) system program will vary depending upon the selected hardware and software suppliers, those trained in the art will appreciate that the sequence of steps set forth in FIG. 6 are sufficient to provide the basic crystallizer and salt basket operational steps during a crystal harvest cycle, thus enabling the programming of same in any convenient operating platform. Also, it should be understood that the general approach of our method of operation is to be appreciated, and that with respect to the steps set forth in FIG. 6, it shall be considered as exemplary and not as exclusive it being evident to those trained in the art that certain valve openings and closings, notably at the start and end of particular segments of automated operations, such as feed of crystals, pressurization/drain, depressurization, open/dump salt, close, and re-fill, may be accomplished by simultaneous as well as sequential change of valve settings, without varying from the fundamental essentials of the automated sequence of operations provided herein.

Reference is again made to FIG. 5. During the normal crystallizer 46 operations (crystal growing cycle), the salt basket 50 is isolated from the crystallizer 46 via way of isolation valve I. Also, for reasons which will be explained further hereinbelow, the salt basket 50 is preferably filled with feed brine 60. These conditions are considered to be the normal start conditions for a cycle to harvest wet salt 48.

To start a salt harvest cycle, the vent valve V is closed, and the isolation (preferably plug type) valve I between the crystallizer and the salt basket 50 is opened. Upon opening of valve I, salt 48 preferably drains by gravity downward through expansion joint 99 and into the salt basket 50. After a sufficient period of time to fill the salt basket 50 with salt crystals 48, normally not exceeding about 30 minutes, the valve I is closed to again isolate the salt basket 50 from the crystallizer 46. The isolation valve I is preferably closed before any further sequence of operations take place an must be closed before any attempt to open the salt basket door takes place. Upon closure of the isolation valve I, the feed valve F is closed and the drain valve D is opened.

Located near the top of the salt basket 50 is a pressurization plug valve P, which is then opened. This valve P and related supply piping is configured to allow either steam 100 (normally reduced from pressurized supply steam 80) or air 102 (normally reduced from system supplied air) to enter the salt basket 50 to slightly pressurize the salt basket 50 (generally not far exceeding 30 psig and normally in the range of 5 to 20 psig with a nominal operation at about 15 psig) to force free liquids downward out of the salt basket 50 through the screen 98 and out past drain valve D. Once the free liquids are drained (purged) from the salt basket 50, additional air 102 and/or steam 100 may be utilized to dry the solids to the degree desired or achievable in a given salt mixture.

Upon completion of the drying/purging cycle (up to about 15 minutes time) the pressurization valve P is closed to turn off the supply of steam 100 and air 102, and drain valve D is closed to isolate the salt basket from the liquid in feed line 62. At this time, feed valve F may be reopened. Subsequently, vent valve V is opened to vent the salt basket 50 and bring the basket to about atmospheric pressure.

When the pressure in salt basket 50 is relieved, the door clamps 133 are opened. Then, the hydraulic door actuator 110 is moved to the open position; during this movement the salt basket door 106 pivots about main pivot pin 110 from the closed, preferably horizontal position to the open, preferably vertical position noted in FIG. 3 above. After opening of the door 106, the vent valve V may be closed. Upon opening of door 106, dry salt 54 is dumped downward into receiver 52.

Since the drain connection 104 is in the door 106, and since the door 106 moves upon the opening thereof, a flex hose 140 is utilized to allow such movement. Also, the flex hose is provided with quick disconnects 142 and 144 at the ends thereof, so that after securing drain valve D and shutoff valve 146, the hose can be removed to facilitate maintenance in case of pluggage or other problems.

After the dump of relatively dry solid salts 54 is completed, the salt basket door 106 is returned by actuator 110 to the closed position. Then, clamps 133 are reset to the closed and locked position. When this is confirmed, the block valve B is closed to block feed from entering the crystallizer 46. Instead, when feed valve F and drain valve D are opened, the salt basket 50 is filled with feed brine 60. With respect to refilling the salt basket 50 with brine 60, it is important to note the use and operation of the vent valve V. This vent valve V is opened whenever the salt basket is being depressurized prior to opening the door 106. Also vent valve V is opened during the backfill or refilling the salt basket with liquid 60; completion of the fill cycle for salt basket 50 is preferably visually confirmed via sight glass 148 confirmation of overflow feed through vent valve V. The vent valve V and line 150 returning the vented vapors to the steam cavity of the crystallizer 46 is important because it allows elimination of air from the salt basket before opening of the the isolation valve I. Thus, no detrimental surge of air is allowed to enter the crystallizer 46 to cause foaming or scaling tendencies.

Upon completion of filling of the salt basket 50 with brine 60, drain valve D is closed, vent valve V is closed, and block valve B is opened to allow feed brine 60 to be fed to the crystallizer 46. After filling of the salt basket 50 with brine 60 is completed, the PLC will reset the system for normal crystallizer 46 operations. Those trained in the art will appreciate that a control system can be further automated within the PLC software to provide for further interlocks and safety checks to insure an easy and safe sequence of operation. However, the specifics required may vary somewhat by the application and are best left to the design engineer considering the specific application.

An important benefit of the above described mode of operation is that because the isolation valve I and drain valve D are not allowed to be open all of the time, highly concentrated liquors are not normally present in the salt basket. This is important because the salt basket is relatively cool compared to the crystallizer, unless extra heating steam were added thereto. Therefore, if the salt basket 50 were, between harvest cycles, supplied with concentrated brine (having crystals therein), further crystal formation would tend to occur therein, with resultant tendency to plug the bottom screen. We have discovered an ideal salt basket operation method which avoids such difficulties. Our method includes (a) isolation of the salt basket during the crystal operation, (b) the use of an intermittent salt crystal harvest, and (c) filling the salt basket with feed between harvest cycles. This method is a marked improvement over heretofore utilized methods for salt recovery and drying in wastewater treatment systems. Also, since scaling and fouling of the salt basket 50 is time dependent, the limited harvest cycle time utilized in our process also helps reduce the tendency of scaling and fouling to occur in the salt basket 50. Moreover, our method of filling the salt basket 50 with fresh feed 60 after a salt drying cycle makes the salt basket 50 essentially self cleaning.

The novel automatic crystal harvest cycle described herein provides a unique apparatus and method for drying solids in zero liquid discharge wastewater systems. Our apparatus and method considerably reduces the life cycle cost for such systems when compared to currently available alternatives. Consequently, we have found that our automated salt basket design, which requires essentially no operator handling of the solids, is a substantial improvement in the art of zero discharge wastewater treatment systems.

Figure 7:
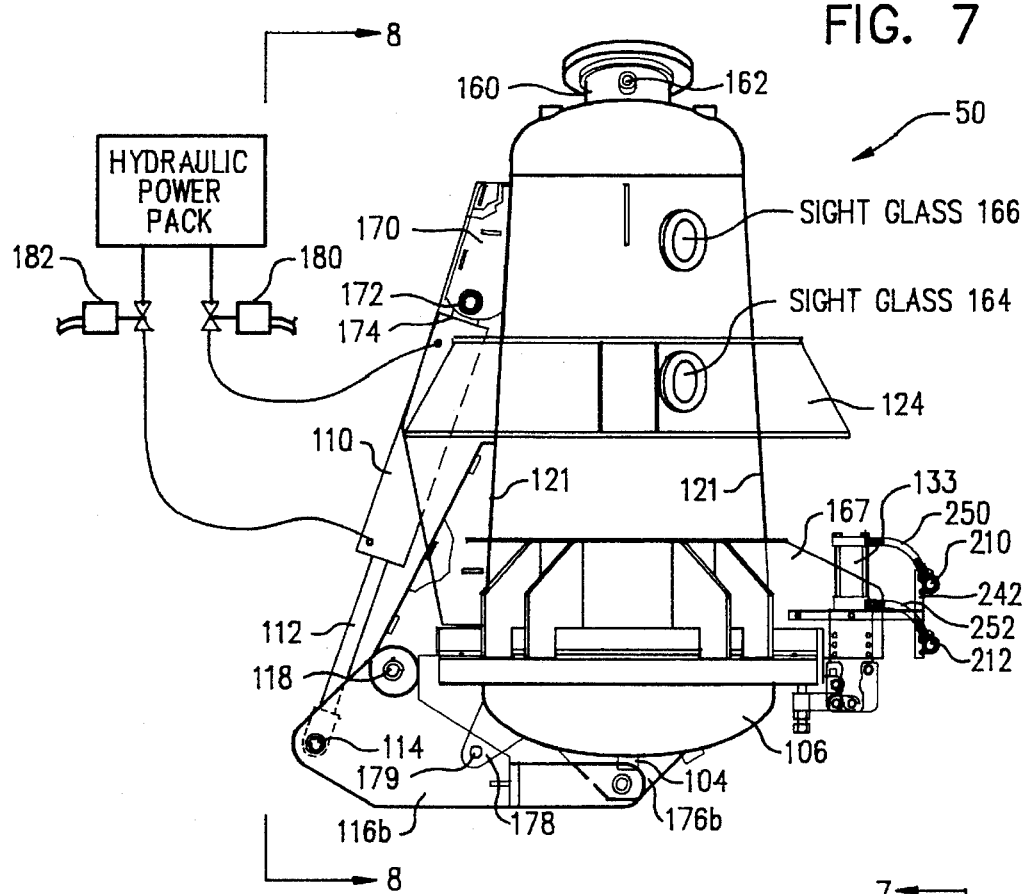
FIG. 7 is a side elevation view of an automated salt basket with a partial cutaway of the air operated closure latches, showing the hydraulic door opening mechanism and the general location of only some of the air operated closure latches.

Details of our improved salt basket apparatus 50 are further illustrated in FIGS. 7 through 14. In FIG. 7, as side view is provide of the salt basket 50. As shown, the vessel has a flanged feed line 160 for receiving the brine slurry from crystallizer 46. A vent connection 162 is provided for connection to vent valve V and vent line 150. Preferably, a lower sight glass 164 and an upper sight glass 166 are provided to let an operator observe the presence (or absence) of salt crystals 48 within the salt basket vessel 50. A drain connection 104 is provided at the bottom of door 106. Support 124 is provided to hold salt basket 50 on a selected support structure as noted above. Stiffening supports 167 are provided to strengthen the vessel and where convenient to provide support means for the peripherally located door clamps 133.

Figure 8:
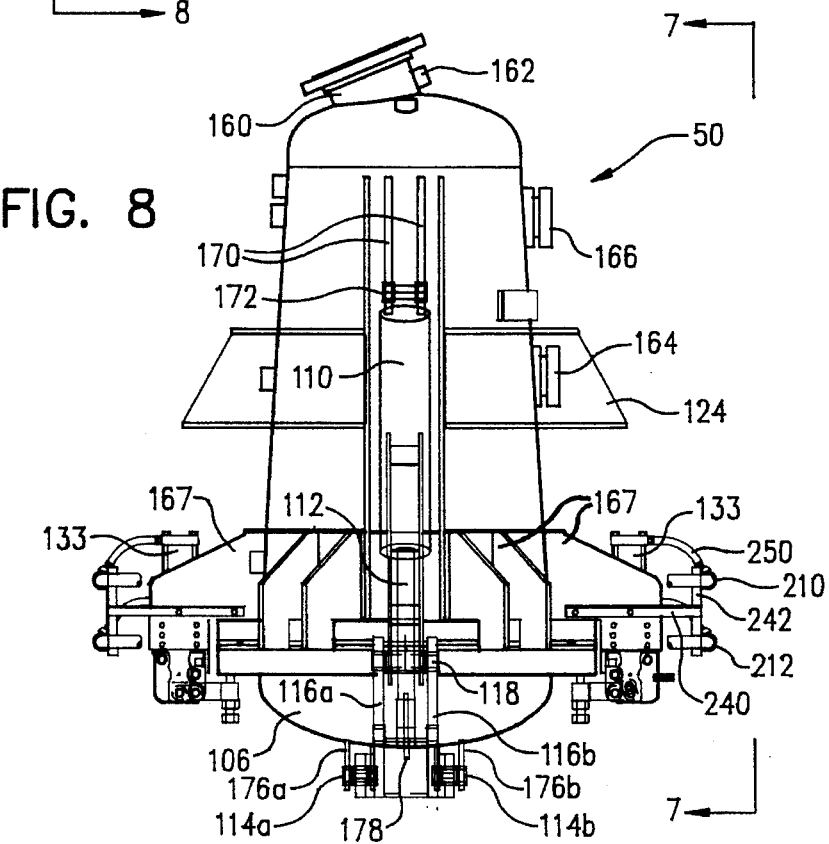
FIG. 8 is a back elevation view of an automated salt basket portion of the present invention taken from the perspective of line 8—8 of FIG. 7.

The door 106 is opened, closed, and kept in place at either position by hydraulic actuator 110, the operation of which is best understood by evaluating FIGS. 7 and 8 together. Brace 170 provides an anchor for upper pivot pin 172 affixed to the upper end 174 of actuator 110. Pivot 172 allows actuator 110 to turn radially during cycling of door 106. At the lower end of actuator 110, a hydraulically extended shaft 112 is provided. The shaft 112 is actuated upwardly, pulling on the elbow pivot pin 114, which in turn is pivotally attached to door crank 116 (which preferably has two portions, 116a and 116b, as can be better noted in FIG. 8). When shaft 112 is retracted upwardly, crank 116a and 116b pivots about main pivot pin 118, thus pulling the door outwardly and downwardly (see FIG. 9). Door 106 is attached to crank 116a and 116b via way of mounting tabs 176a and 176b, and may also be secured by positioning tab 178 and securing means such as pin 179 (which is attached to crank 116a and 116b). The hydraulic actuator 110 is ordinarily powered by a remote hydraulic power pack. This arrangement, in addition to having the usual hydraulic controls, is also provided with normally closed solenoid 180, which when seated (closed) with shaft 112 extended prevents the door 106 from opening, and normally closed solenoid 182 which when seated (closed) and shaft 112 retracted prevents the door 106 from closing. These are important features since the use of solenoids 180 and 182 and appropriate interlocks prevent the door 106 from opening (or closing) unexpectedly during operations.

FIG. 10 further illustrates the screen 98 position in door 106. Screen 98 is mounted in the upper portion 184 of door 106, and is best employed to cover substantially the full inside diameter of door 106. The screen 98 serves to separate free liquids 185 (which substantially pass through) from solid salts (which are substantially held above the screen 98). The free liquids 185 and any entrained solids flow toward the drain 104 located in the lower reaches of door 106. We have found that a slotted brine screen 98 such as is available from Johnson Filtration Systems, Inc., SBS Model E (SP) Support Grid, manufactured as 93 VEE wire with 0.01" slot (spacing diameter at 250° F.) is satisfactory. We prefer use of Monel (Alloy 400) for corrosion resistance, and of a design thickness to support 50 psig differential pressure at 300° F., although it will be appreciated by those skilled in the art that a variety of screen designs and materials would be satisfactory. Mounting means such as flange 186 and fastener 188 have been found satisfactory to secure screen 98 in the door 106.

FIG. 10 also shows upper flange 190 and door flange 192. The door flange 192 is urged upward by adjustment means 194 on arm 196 of clamp 133. To reduce costs, we have used cladding 198 and 200 for the upper flange and the door flange, respectively, of corrosion resistant alloy. As more clearly shown in FIGS. 9 and 9A, to facilitate sealing the salt basket 50 when pressurized, we have included a groove 202 in the cladding 198 of flange 190 to accommodate an o-ring type seal 204, which is preferably adhesively or mechanically secured within grove 202.

Clamp 133 may be affixed to salt basket 50 by any convenient joining means; we utilize bolt type fasteners 206 which are affixed through conveniently located apertures defined by wall 208 in housing 209 of clamp 133.

FIGS. 9 and 10 disclose the position and mounting of upper or air-to-close manifold header 210 and the lower or air-to-open manifold header 212. These headers supply pressurized air to the upper actuator end 214 (to close) and the lower actuator end 216 (to open) of the pneumatic cylinder 218 of clamp 133.

Pressurization of air-to-close header 210 forces shaft or rod 220 of clamp 133 downward, which in turn forces arm 194 upward in the direction of reference arrow 215 in FIG. 9 toward the door flange 192, i.e. toward the closed and locked position. When the air-to-open header 212 is pressurized, shaft or rod 220 of clamp 133 is pushed upward forcing arm 194 downward in the direction of reference arrow 216 in FIG. 10.

Figure 11:
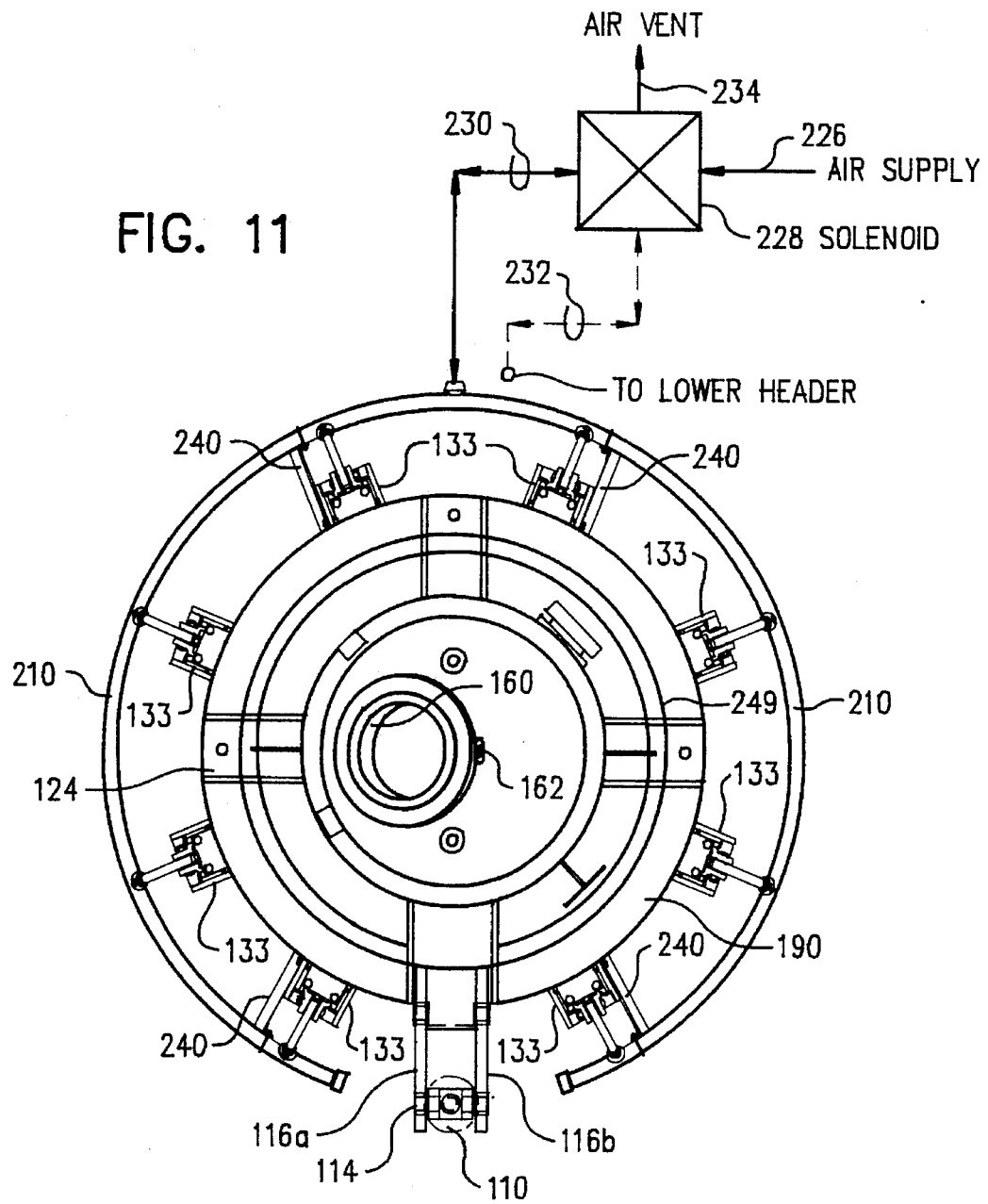
FIG. 11 is a top view of the salt basket, showing the arrangement of the air headers used to supply air to the closure latch mechanisms.

Operation of the clamp 133 air supply system is better understood with the diagrammatic flow diagram at the top of FIG. 11. Pressurized air 226 is supplied to a four (4) way solenoid 228 for control of the clamping system. The air supply line 230 to the air-to-close header 210, and the air supply line 232 to the air-to open header 212, have bi-directional flow. That is, each of lines 230 and 232 can be pressurized, with resultant inward flow, or vented, with resultant outward flow to release air pressure therein. Solenoid 228 assures that air is being pressurized to only one or the other of lines 230 and 232. The line which is not being pressurized is vented via air vent 234. We have found it advantageous to mount both air headers 210 and 212 on a spider type support means comprised of channel 240 and brackets 240, so that the headers piping is spaced outwardly from and circumferentially surrounds the salt basket 50. That way, the air headers 210 and 212 can conveniently service the power clamps 133 which are located around the periphery of the door 106, and where as here the door is circular in shape, circumferentially about the door 106.

In the top down view of FIG. 11, the advantagous downwardly and outwardly sloping outer sidewall 248 (corresponds to the outwardly sloping inner sidewall 121) can be appreciated; sidewall 248 has a lower end portion 249 adjacent the flange portion 190.

Figure 12:
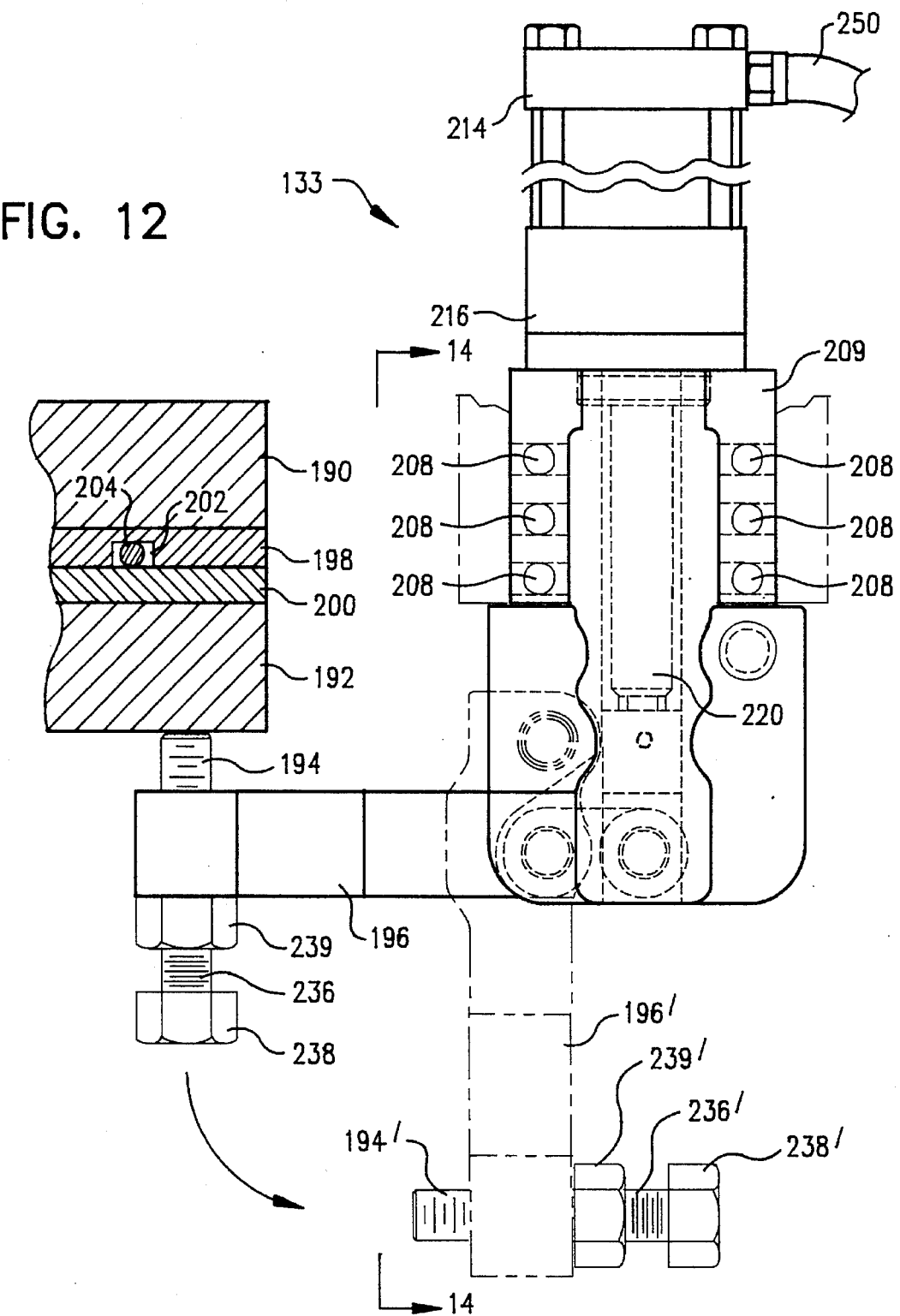
FIG. 12 is a side view of details of the locking power clamp and arm with adjustment means, showing its relationship to the salt basket door flanges when in the closed and locked position, as well as when the lock is in the open position.

The open position of the clamp 133 is better seen in FIG. 12, where locking arm 196' and related adjustment means is shown in broken lines and with a (') prime suffix as they appear at the open position. Clamps 133 are locking power clamps such as are available from the De-Sta-Co. Div. of Dover Corporation, Birmingham, Mich., and which are described in U.S. Pat. No. 4,458,889, issued Jul. 10, 1984 to A. W. McPherson, entitled LOCKING POWER CLAMP, the disclosure of which is incorporated herein by reference. The clamps 133 work on an eccentric locking principle, much like commonly used vice grips. That is, once the clamps are fully positioned in a locked, closed position, they must be energized (via the air-to-open header 212) to spring the arm 196 from the closed to the open position. Simply venting the air from the closing header 210 will be insufficient to cause the arm 196 to release from the locked position.

When the arm 196 is closed, you get about 1500 to 2000 pounds of closing force (between adjustment means 194 and lower flange 192) depending upon the air pressure used. However, once the arm 196 is snapped into the closed, locked position, we have found that the arm 196 of a locked clamp 133 will withstand in excess of 17,000 pounds of downward force, before a portion of clamp 133 deforms, eventually causing failure of clamp 133 and and resultant opening of the salt basket 50 door 106. This type of locking mechanism is quite important in application of the salt basket 50 door 106, since this provides a unique margin of safety not available by use of a simple air cylinder actuator mechanism. For this application, we have provided a hardened steel clamp arm 196. Also, we have provided an adjustment means 194, preferably with threads 236 which may be turned on companion threads in arm 196 by bolt head 238 and tightened by nut 239. With this adjustment means, the actual closing torque on the door 106 may be adjusted as necessary to achieve a uniform seal at the o-ring 204.

As can be seen in the plan view of FIG. 11, the clamps 133 are arranged around the periphery of the door 106, so as to provide relatively evenly spaced locking safety clamps 133. The headers 210 and 212 are supported by support channels 240 and 242, or any other convenient means. Air from header 210 and 212 is supplied to clamp 133 via rubber hoses 250 and 252, respectively.

It is clear from the heretofore described figures that the present invention as described above provides a simple, labor saving apparatus and method for removal of salts from zero liquid discharge type industrial wastewater treatment systems. In so far as it will be readily apparent to those skilled in the art that the terms solids and salt are not synonymous, and although the present apparatus and method is primarily directed at separation of salts, it is nevertheless well suited for separation of other solids from liquids, and the claims shall be read without limiting the term salt to its strict technical meaning, but shall include other solids where appropriate to give full effect to the scope of the claims. Also, those knowledgeable in the art will appreciate that the techniques described herein are easily adapted to the use of evaporation and crystallization equipment which may be either of the vapor compression or multiple effect design, or to various types of crystallization apparatus, and no limitation of the claims is intended with respect to use of the salt basket described herein with respect thereto.

Further, it will be readily apparent to the reader that the present invention may be easily adapted to other embodiments incorporating the concepts taught herein and that the present figures are shown by way of example only and not in any way a limitation. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalences of the claims are therefore intended to be embraced therein.

We claim:

1. A method of dewatering the solids which are present in a liquid and solids slurry which is produced by precipitating solids from a wastewater feed stream in a crystallizer, said method comprising:

(a) introducing said slurry from said crystallizer into a pressurizible salt basket vessel, said vessel including a combination pivotable screen and bottom door portion;

(b) isolating said salt basket from said crystalizer;

(c) slightly pressurizing said salt basket vessel, so as to force said free liquids through a screen and outward through a drain and to substantially retain said solids before said screen;

(d) depressurizing said salt basket apparatus;

(e) opening the bottom door portion of said salt basket apparatus to downwardly pivot said bottom door portion and said screen to substantially empty the solids from said salt basket by allowing the solids above said screen in the salt basket vessel to fall by gravity from the salt basket vessel;

(f) closing said bottom door portion of said salt basket vessel to return the salt basket vessel to a pressurizable condition.

2. The method as set forth in claim 1, further comprising, after the step of closing the bottom door portion of said salt basket vessel, the step of introducing said feed wastewater into said salt basket, so as to substantially fill said salt basket with said feedwater.

3. The method as set forth in claim 2, further comprising the step of isolating said salt basket from said crystallizer after filling said salt basket with said feedwater until such time as it is desired to introduce a new batch of solids into the salt basket vessel.

4. The method as set forth in claim 2, further including the step of dissolving at least a portion of the solids which remain in said salt basket after the step of substantially emptying solids from said salt basket.

5. The method as set forth in claim 1, wherein the step of pressurizing said vessel is accomplished by introducing steam into said vessel.

6. The method as set forth in claim 1, wherein the step of pressurizing said vessel is accomplished by introducing pressurized air into said vessel.

7. A method of dewatering the solids which are present in a slurry comprised of a free liquid and solids which have been precipitated in a crystallizer, and where said solids comprise any one or more of the salts selected from the group consisting of (i) sodium sulfate, (ii) sodium chloride, and (iii) glauber's salt, said method comprising:

(a) introducing said slurry from said crystallizer into a pressurizible salt basket vessel having a lower pivoting screen portion, a drain, and a downwardly pivoting bottom opening door;

(b) isolating said salt basket from said crystallizer;

(c) slightly pressurizing said salt basket vessel, to force said free liquids through said screen portion and outward through said drain, to extract liquids from said vessel and to substantially retain said solids above said screen;

(d) depressurizing said salt basket apparatus;

(e) opening the door of said salt basket apparatus to downwardly pivot said door and said screen portion to discharge the solids by allowing the solids located above the screen portion to fall by gravity from the salt basket vessel;

(f) closing said door of said salt basket vessel to return the salt basket vessel to a pressurizable condition.

8. The method as set forth in claim 7, further comprising, after the step of closing the bottom portion of said salt basket vessel, the step of introducing said feed wastewater into said salt basket, so as to substantially fill said salt basket with said feedwater.

9. The method as set forth in claim 7, further comprising the step of isolating said salt basket from said crystallizer after filling said salt basket with said feedwater until such time as it is desired to introduce a new batch of solids into the salt basket vessel.

10. The method as set forth in claim 7, wherein the step of pressurizing said vessel is accomplished by introducing steam into said vessel.

11. The method as set forth in claim 7, wherein the step of pressurizing said vessel is accomplished by introducing pressurized air into said vessel.

12. The method of claim 7, further comprising the step of locking said door after closing said door.

13. The method of claim 12, wherein said door further includes a hydraulic actuator for opening and closing, and wherein the step of locking said door includes hydraulically locking a the actuator in a closed door position.

14. The method of claim 12, wherein (a) (i) the bottom opening door includes peripheral flanges, and (ii) the bottom of the salt basket includes companion flanges to said just mentioned peripherial flanges, and (b) the step of locking said door further includes securing said peripherial and said companion flanges between locking power clamps, and wherein said locking power clamps compressingly engage said peripherial flanges to said companion flanges on said salt basket vessel.

15. A method of dewatering solids which are present in a mixture comprised of a free liquid and solids which have been precipitated in a crystallizer, said method comprising:

(a) introducing said solids from said crystallizer into a pressurizible salt basket vessel having a lower pivotable screen portion, a drain, a vent, and a downwardly pivoting bottom opening door;

(b) isolating said salt basket from said crystallizer;

(c) opening said drain to allow free liquids to drain by gravity from said salt basket;

(d) slightly pressurizing said salt basket vessel, to force said free liquids through said screen portion and outward through said drain, to extract liquids from said vessel while substantially retaining said solids above said screen;

(e) depressurizing said salt basket apparatus;

(f) closing said drain valve;

(g) opening the vent to allow the salt basket pressure to equalize with the ambient atmospheric pressure;

(h) opening the door of said salt basket apparatus to downwardly pivot said door and said screen portion to discharge the solids by allowing the solids located above the screen portion to fall by gravity from the salt basket vessel;

(i) closing the vent;

(j) closing said door of said salt basket vessel to return the salt basket vessel to a pressurizable condition.

16. The method of claim 15, further comprising the step of locking said door after the step of closing said door.

17. The method of claim 16, wherein said door further includes a hydraulic actuator for opening and closing, and wherein the step of locking said door includes hydraulically locking the actuator in a closed door position.

18. The method of claim 17, (a) wherein (i) the bottom opening door includes peripherial flanges, and (ii) the bottom of the salt basket includes companion flanges to said just mentioned peripherial flanges, and (b) wherein the step of locking said door further includes securing said peripherial and said companion flanges between locking power clamps, and wherein said locking power clamps compressingly engage said peripherial flanges to said companion flanges on said salt basket vessel, and where said power clamps must be positively powered to disengage said clamps from the locked position.

19. The method as set forth in claim 15, further comprising, after the step of closing the bottom door of said salt basket vessel, the step of introducing said feed wastewater into said salt basket, so as to substantially fill said salt basket with said feedwater.

20. The method as set forth in claim 19, further comprising the step of isolating said salt basket from said crystallizer after filling said salt basket with said feedwater until such time as it is desired to introduce a new batch of solids into the salt basket vessel.

21. The method as set forth in claim 15, wherein the step of pressurizing said vessel is accomplished by introducing steam into said vessel.

22. The method as set forth in claim 15, wherein the step of pressurizing said vessel is accomplished by introducing pressurized air into said vessel.

23. The method as set forth in claim 15, wherein said solids comprise any one or more of the salts selected from the group consisting of (i) sodium sulfate, (ii) sodium chloride, and (iii) glauber's salt.

* * * * *

UNITED STATES PATENT AND TRADEMARK OFFICE
CERTIFICATE OF CORRECTION

PATENT NO.    : 5,472,622
DATED         : December 5, 1995
INVENTOR(S)   : Solomon, Robert L. et al.

It is certified that error appears in the above-identified patent and that said Letters Patent is hereby corrected as shown below:

Column 1,
Line 29, after the word "Typically,", delete "the".
Line 50, after the word "the", delete "of".

Column 7,
Line 11, after the word "Section" delete "264,314," and substitute therefore -- 264.314, --.

Column 9,
Line 9, after the word "place", delete "an" and substitute therefore -- and --.

Column 10,
Line 2, after the words "of the", delete "the".
Line 52, delete "as side view is provide" and substitute therefore -- a side view is provided --.

Column 12,
Line 13, delete the words "air-to open" and substitute therefore -- air-to-open --.
Line 57, after the words "clamp 133" delete "and".

Column 13,
Line 49, delete "pressurizible" and substitute therefore -- pressurizable --.

Column 14,
Line 27, delete "pressurizible" and substitute therefore -- pressurizable --.
Line 66, after the word "locking" delete "a".

Column 15,
Line 13, delete "pressurizible" and substitute therefore -- pressurizable --.

Signed and Sealed this

Fourth Day of March, 2003

JAMES E. ROGAN
*Director of the United States Patent and Trademark Office*